July 25, 1939.  H. GOLDBERG  2,166,952
NUT TAPPING MACHINE
Filed Sept. 28, 1936  4 Sheets-Sheet 1

Inventor:
Herman Goldberg
by Davis, Lindsey, Smith & Shonts,
Attys.

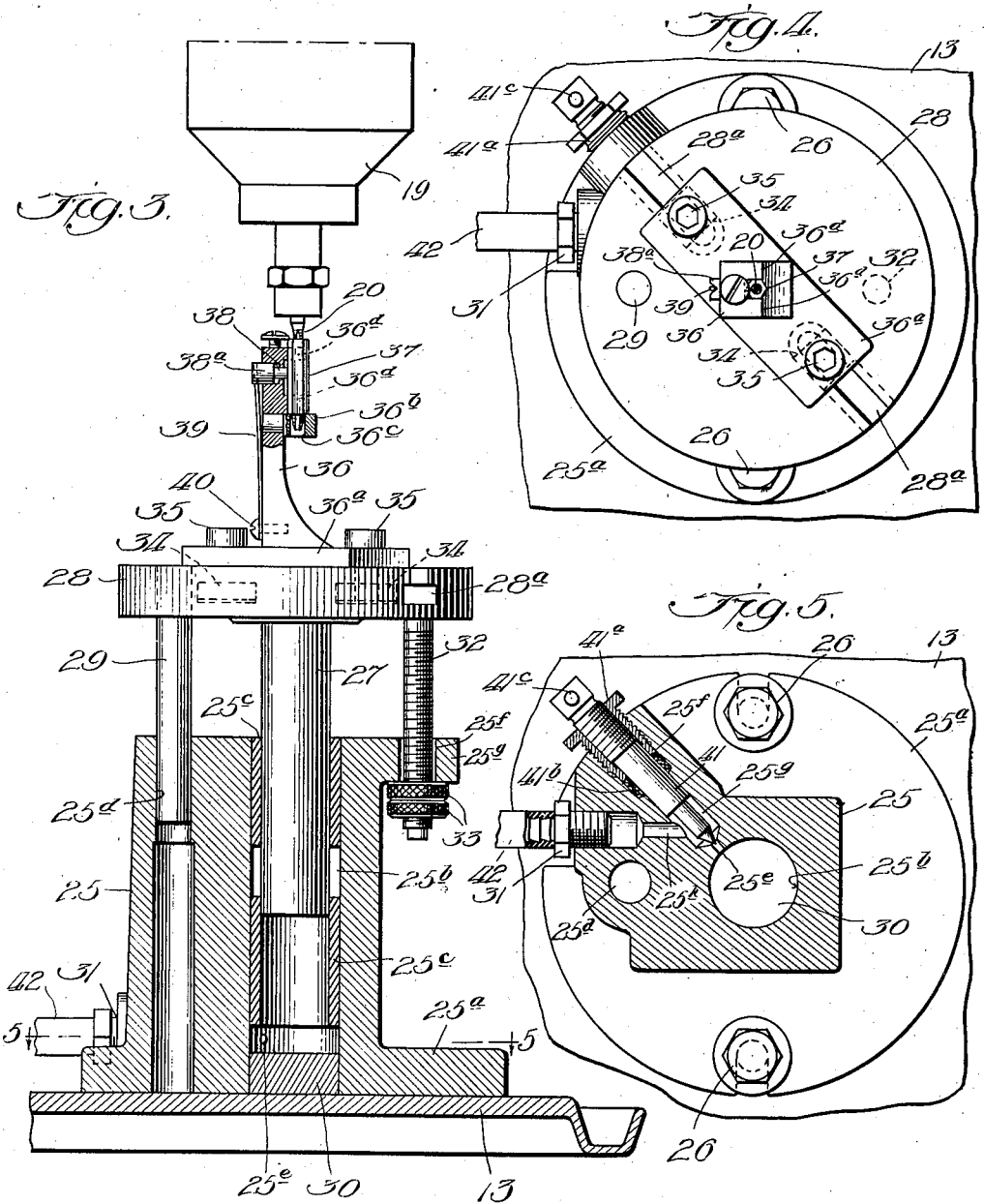

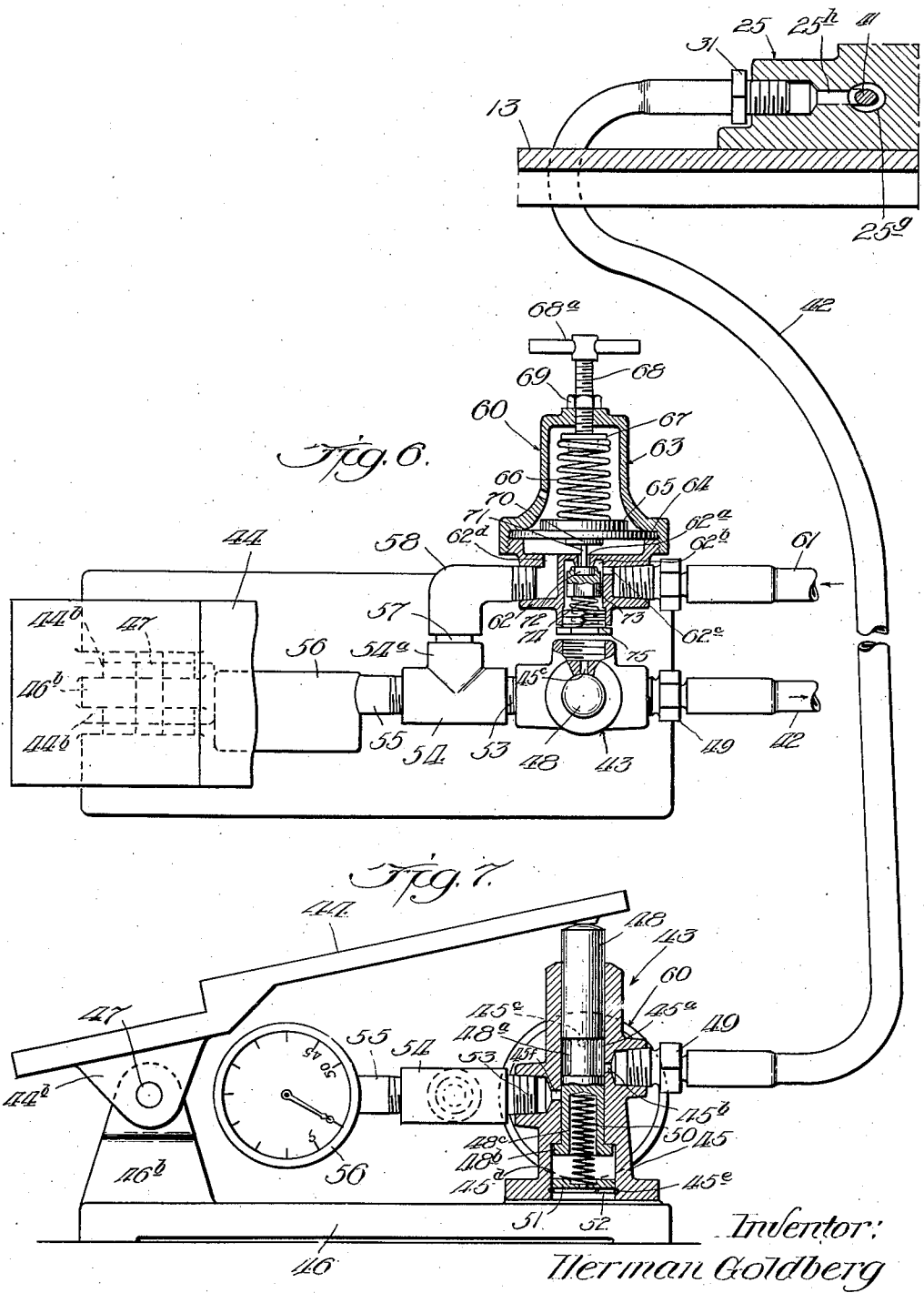

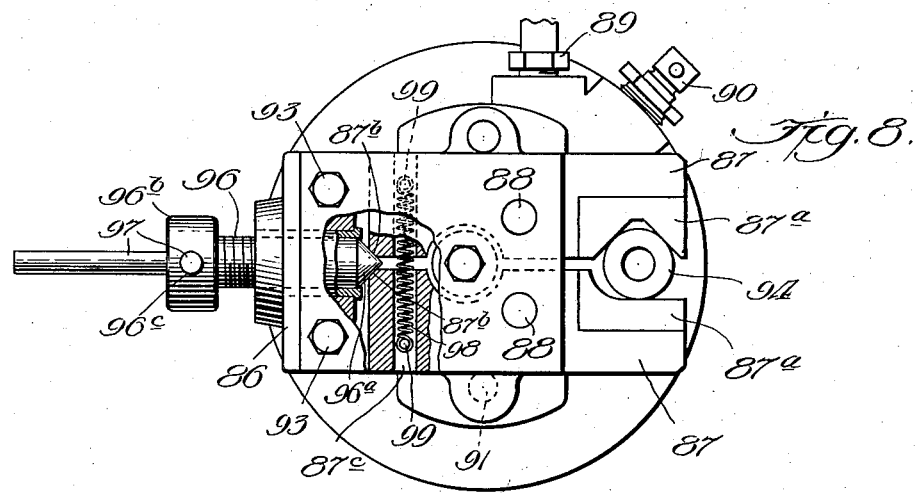
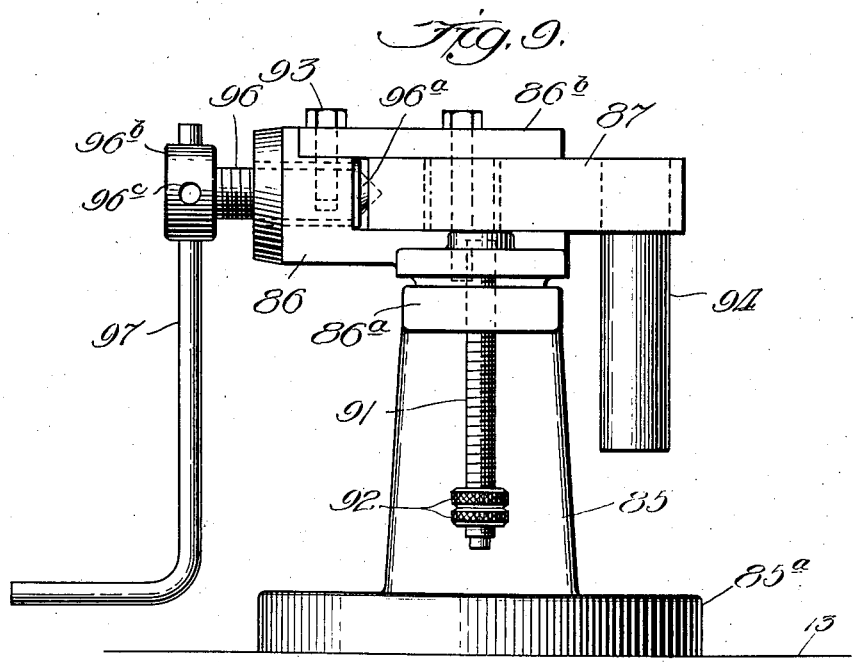

Patented July 25, 1939

2,166,952

UNITED STATES PATENT OFFICE 2,166,952

NUT TAPPING MACHINE

Herman Goldberg, Chicago, Ill.

Application September 28, 1936, Serial No. 102,839

11 Claims. (Cl. 10—105)

This invention relates to improvements in nut tapping machines and the like and its purpose is to provide an improved device by which the tapping of nut blanks and other similar operations may be more conveniently and quickly carried on than has heretofore been possible with any of the forms of apparatus in commercial use. The invention may be employed for countersinking drilled holes and other like operations and the attachments which embody the improvements of the present invention may be emploped in connection with any of the well known forms of drill presses and the like to adapt these machines to use for tapping nuts. Heretofore, when a drill press or similar machine has been employed for tapping a nut blank or effecting other similar operations, it has been necessary for the operator to effect a longitudinal movement of the spindle carrying the rotating tap or other cutting tool in order to bring that tool into engagement with the work and this has required considerable exertion on the part of the operator while, at the same time, having the disadvantage of being a comparatively slow and inefficient operation. The principal object of the present invention is to overcome these difficulties by providing in combination with a machine having a rotating tool-carrying spindle, an attachment capable of application to that machine for holding the work and permitting an instantaneous movement of the work into engagement with the tool by the application of fluid pressure. A further object is to provide a machine carrying a rotating tool with means for holding the work to be engaged by the tool and fluid pressure means by which the work may be moved into engagement with the tool by fluid pressure under the control of the foot of the operator, thus leaving both hands of the operator free for handling the pieces of work which are successively placed in the machine. Another object is to provide a machine having a reversible tool-carrying driving spindle with fluid pressure means under the control of the operator for feeding the work into engagement with the tool and including means controlled by the escape of fluid pressure for regulating the withdrawal of the work from the tool when the direction of rotation of the tool is reversed. Still another object is to provide a machine having a tool-carrying spindle in combination with a work holder operated by fluid pressure for bringing the work into engagement with the tool and comprising means for regulating the scope of the work and the effect of the fluid pressure upon the forward and reverse strokes of the work holder. Other objects relate to various features of construction and arrangement which will appear more fully hereinafter.

The nature of the invention will be understood from the following specification taken with the accompanying drawings, in which one form of the invention and a modification of a portion thereof are illustrated.

In the drawings,

Fig. 3 shows an enlarged vertical section on the line 3—3 of Fig. 2 after the work holder has been operated to move the work into engagement with the rotating tool of the machine;

Fig. 4 shows a top plan view of the work holder illustrated in Figs. 2 and 3;

Fig. 5 shows a horizontal section taken on the line 5—5 of Fig. 3;

Fig. 6 shows a partial top plan view of the foot-operated control valve which is embodied in the apparatus illustrated in Fig. 1, the regulating valve associated with this control valve being shown in horizontal section;

Fig. 7 is a somewhat diagrammatic vertical section through the foot-operated control valve shown in Figs. 1 and 6 and through a portion of the base of the work holder;

Fig. 8 is a view similar to that of Fig. 4, showing a top plan view of a modified form of work holder adapted for use with the other features of the present invention; and Fig. 9 is a side elevation of the modified form of work holder shown in Fig. 8.

Figure 1:
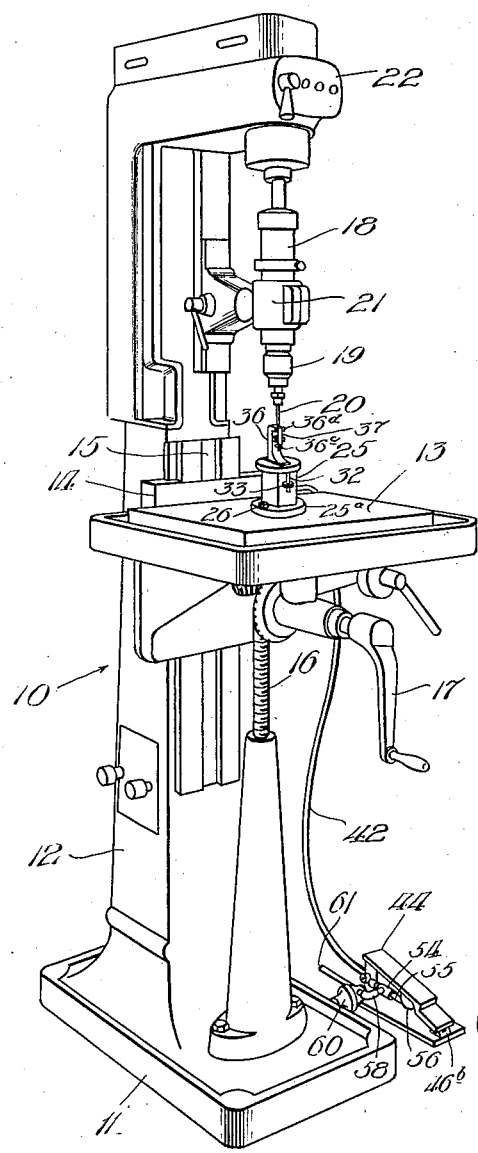
Fig. 1 shows a perspective view of one form of machine embodying the improvements of the present invention.
Figure 2:
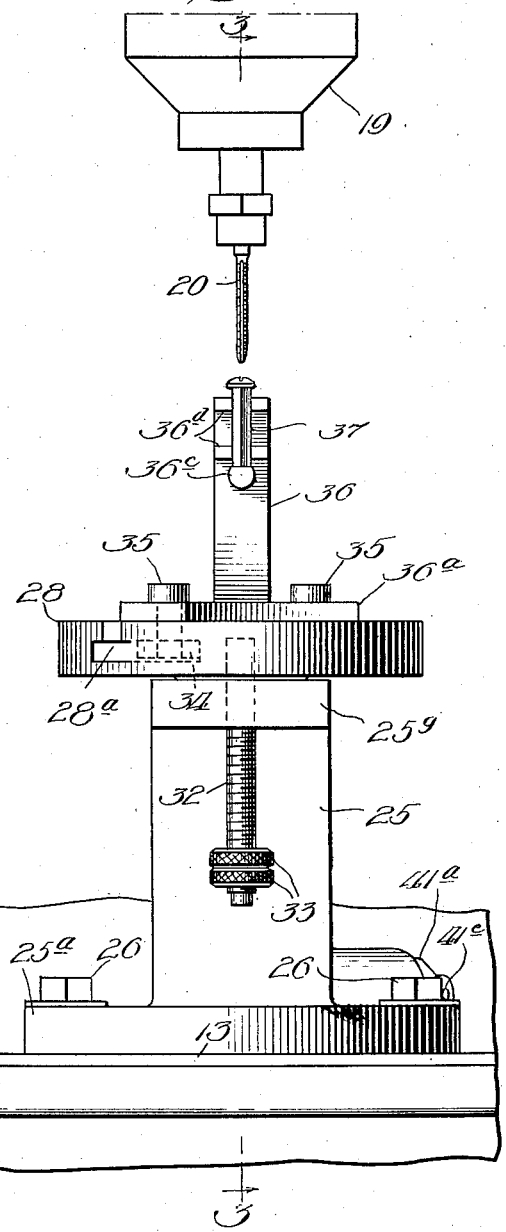
Fig. 2 shows an enlarged front elevation of the work holder embodied in the machine illustrated in Fig. 1.

As illustrated in Figs. 1 to 7, inclusive, the invention is embodied in a machine 10 having a base 11 adapted to rest upon a floor or the like, and a standard or pedestal 12 extending upwardly from that base and carrying the principal parts of the machine. The machine embodies a table 13 carried by a block 14 which is adjustable vertically in a guide 15 by means of a screw 16 and an operating handle 17, thus permitting the elevation of the platen 13 to be regulated to suit the character of the work being operated upon. Above the table 13 there is mounted a rotatable tool-carrying spindle 18 which is provided at its lower end with a reversible tapping chuck 19 having mounted therein the nut tap or other tool 20 which is adapted to engage the work being operated upon by the machine. The spindle 18 is pivotally mounted at an intermediate point in the bearing 21 and is connected at its upper end to suitable motor driven driving mechanism contained in a housing 22. This driving means preferably includes reversible driving mechanism such as the reversible friction clutch mechanism described in my copending applications Serial No. 673,383, filed May 29, 1933, and Serial No. 749,222, filed October 20, 1934. This driving means comprises an intermediate friction driving member which is connected to the spindle and which is normally forced into driving engagement with a direct driving member when the spindle and the tap are slightly elevated by the pressure of the work on the tap, together with a reverse driving friction member which is adapted to be engaged by the driving member on the spindle after the tapping of a piece of work has been completed and the work moves downwardly to exert a longitudinal pull upon the tap and the spindle.

The present invention provides means by which the work to be operated upon by the tap or other tool 20 is supported on the table 13 by means which is capable of being actuated by fluid pressure to move the work longitudinally with respect to the tool 20 which has no movement longitudinally of its own axis except for the limited movement which is incidental to the reversal of the driving mechanism. This supporting means for the work comprises a cylinder block 25 provided with a base flange 25ª which rests upon and is secured to the table 13 by means of studs 26 or the like which engage slots in the outer edges of the flange as shown in Fig. 5. The cylinder block 25 has a chamber 25ᵇ having secured therein a pair of bushings 25ᶜ in which there is slidably mounted a piston 27 carrying at its upper end the platen 28. This platen is circular in form and is held against rotation with respect to the cylinder block 25 by means of a guide rod 29 which is secured to the under side of the platen and which slidably engages a tubular bore 25ᵈ extending downwardly from the upper end of the cylinder casing which is enlarged at one side for this purpose. The chamber 25ᵇ of the cylinder block is closed at its lower end by a cap or plug 30 and compressed fluid is admitted to the lower end of the chamber through a port 25ᵉ which communicates with a nozzle or fitting 31 adapted to be connected with the compressed fluid supply. When compressed fluid is admitted to the chamber 25ᵇ, the piston 27 is forced upwardly, carrying with it the platen 28, and the extent of this upward movement is determined by an adjusting screw 32 which is secured to the under side of the platen and which loosely engages an aperture 25ᶠ formed in the flange 25ᵍ which extends laterally from the upper end of the cylinder block. A pair of knurled adjusting nuts 33 are mounted on the lower end of the adjusting screw 32 and these may be secured in any desired position on the screw to determine the limit of the upward movement of the platen.

The platen 28 is provided with T-shaped slots or undercut grooves 28ª which open downwardly from the top of the platen and extend radially inward from opposite sides thereof. These slots are adapted to be engaged by nuts 34 which receive the lower threaded ends of bolts 35. These bolts serve to secure on the platen a work holder or bracket 36 which has a base flange 36ª provided with slots or notches 36ᵇ adapted to receive the stems of the bolts. The heads of these bolts overlap the margins of these notches and when they are adjusted downwardly, they operate to clamp the work holder 36 securely in place on the platen 28 so that when the platen is moved upwardly by fluid pressure, the work carried by the holder is moved upwardly with respect to the rotating tap or other tool 20. Various forms of brackets or work holders 26 may be employed in connection with the platen 28 and the bolts 35 are adjustably mounted for that purpose. In this particular embodiment, the work holder 36 comprises an outwardly extending part 36ᵇ which is apertured as shown at 36ᶜ to receive the lower end of the tap 20 when the platen 28 is in its extreme upper position as shown in Fig. 3. Two pairs of arms or flanges 36ᵈ extend outwardly from the part 36ᵇ and are adapted to engage the sides of a nut or hexagonal sleeve 37 when the latter is supported on the part 36ᵇ, thus preventing rotation of the nut or sleeve. This nut or sleeve is inserted in the spaces between the arms or flanges 36ᵈ by the fingers of the operator and after it has been internally threaded by effecting an upward movement of the platen 28, it may be released by the operator so that, after the tap has been withdrawn from the member 37 by the downward movement of the platen 28, the member 37 may then be automatically ejected by means of a pin 38 carried by a block 38ª which is mounted in a recess in the rear side of the holder 36. The pin 38 extends through an aperture at the bottom of this recess to engage one side of the member 37 and after the member 37 has been released by the tap 20, the pin 38 is moved toward the right, as viewed in Fig. 3, by the action of a spring 39 which engages the outer end of the block 38ª and which is secured at its lower end by a screw 40 to the lower portion of the member 36, thereby forcing the member 37 from its position in the work holder. A new untapped member 37 may then be inserted between the arms 36ᵈ against the pressure of the spring 39 in readiness for a succeeding upward movement of the platen 28.

After the tapping of a member 37 has been completed, the platen 28 is at the upper end of its stroke and the compressed fluid in the cylinder chamber 25ᵇ is then exhausted through the port 25ᵉ as the platen 28 and the piston 27 descend by gravity. In order that the rate of exhaust of this compressed fluid in the cylinder may be controlled as desired, the needle valve 41 is provided for controlling the opening of the port 25ᵉ. This needle valve is externally threaded for engagement with an internally threaded sleeve 41ª which is also externally threaded for engagement with the walls of a tubular passage 25ᵍ which extends inwardly toward the chamber 25ᵇ through a boss which is formed on the cylinder block as shown in Fig. 5. The sleeve 41ª serves as a packing gland and is adapted to compress packing material 41ᵇ which is mounted in the chamber around the enlarged portion of the needle valve stem at the inner end of the sleeve. A handle 41ᶜ is mounted on the outer end of the needle valve and the inner end thereof is reduced in diameter so that a chamber 25ᵍ is formed around this portion of the valve to receive the compressed fluid which passes thereto through the passage 25ʰ by which communication is established with the fitting or nozzle 31, previously referred to. By adjusting the needle valve 41, the degree of opening of the port 25ᵉ may be regulated in order to control the rate of lowering of the platen 28 which should be proportional to the pitch of the threads formed by the tap and the rate of rotation of the tap.

The fitting 31 through which compressed fluid is supplied through the passage 25e to the lower end of the cylinder is connected to a flexible tube 42 which extends over the edge of the table 13 and downwardly to the floor, as shown in Fig. 1, where it is connected to a control valve 43 adapted to be actuated by a foot pedal 44. The control valve 43 comprises a valve casing 45 which is mounted upon the base 46 by which the foot pedal 44 is carried. This base 46 is provided with an ear 46b adapted to extend between a pair of flanges 44b which extend downwardly from the foot pedal 44. A pivot pin 47 engages these overlapping parts so that the foot pedal is capable of pivotal movement on the base 46 with the forward end thereof resting upon the upper end of a plunger 48. This plunger 48 is slidably mounted in the cylindrical chamber 45a of the valve casing and is adapted to control the admission of compressed air or other fluid to the flexible tube 42 which is connected to the valve casing through a nipple 49 having communication with a port 45b in the side of the valve chamber. The plunger 48 is provided in its lateral side with an annular groove 48a which, when the plunger is in its upper position as shown in Fig. 7, is adapted to communicate with the port 45b and also with an exhaust port 45c extending through the side of the valve casing, thus permitting the escape of compressed fluid from the chamber 25b of the cylinder block 25 and thereby allowing the platen 28 and its connected piston 27 to move downwardly by gravity from their upper positions shown in Fig. 3. The plunger 48 is further provided at its lower end with a laterally extending flange 48b which occupies the enlarged bore 45d at the lower end of the valve chamber and which is adapted to engage the annular shoulder at the upper end of this enlarged portion to limit the upward movement of the plunger under the influence of a coil spring 50. This coil spring extends into a tubular recess 48c which is formed in the lower end of the plunger and its lower end engages a depression in a stop member or block 51 which closes the lower end of the enlarged chamber 45d and which is held in position by a resilient split wire ring 52 occupying an annular groove 45e in the wall of the enlarged chamber 45d.

When the plunger 48 is depressed by the foot pedal 44, it moves downwardly against the compression of the spring 50 until the elongated annular groove 48a is in such a position that it establishes communication between the port 45b and another port 45f extending through the opposite side of the valve casing at a lower level. This port 45f is adapted to supply compressed air or the like to the annular space formed by the groove 48a in the plunger and for this purpose it is arranged to communicate with a connector 53 by which communication is established with a T-connection 54. The end of the T-connection 54 opposite the connector 53 is connected through a pipe 55 with a pressure gauge 56 adapted to indicate the pressure of the compressed fluid which is supplied to the control valve 43. The stem 54a of the T-connection is connected through a short pipe section 57 with an elbow 58 by which a communication is established with a pressure regulator 60 adapted to receive compressed air or other compressed fluid through a supply pipe 61 leading from an air compressor or the like. The compressed air or the like may be supplied through the pipe 61 at a standard uniform pressure, for example, and the pressure regulator 60 may be adjusted in order to supply any desired pressure to the control valve 43 as indicated by the gauge 56.

Although the pressure regulator 60 may assume various forms, there is illustrated in the drawings a well known standard form of pressure regulator comprising a lower casing 62 and an upper casing 63 which have threaded engagement with each other and which are adapted to clamp between them a diaphragm 64. A plate 65 is mounted on the upper side of the diaphragm 64 and a coil spring 66 is mounted between this plate and a collar 67 which is mounted on the lower part of an adjusting screw 68. This screw has a handle 68a and is adapted to be secured in adjusted position by a lock nut 69 after it has been manipulated to regulate the initial compression of the spring 66 which must be overcome by the upward movement of the diaphragm under the influence of the compressed air or other fluid which is admitted to the chamber of the lower casing 62 through the pipe 61. A disk 70 is attached to the lower face of the diaphragm 64 and this disk is connected by a valve stem 71 with a valve member 72 which is adapted to control the opening of a port 62a formed in the transverse wall of the lower casing 62. This valve member 72 is carried by a block 73 which is normally pressed in an upward direction by a coil spring 74. This coil spring has its lower end mounted in a plug 75 which may be adjusted in a threaded aperture in the lower part of the casing 62 in order to vary the compression of this spring which tends normally to move the valve 72 to a position wherein it closes the port 62a. The compressed air or other fluid which is supplied through the pipe 61 is admitted to the chamber 62b below the port 62a through a port 62c and the back pressure of the compressed fluid in the elbow 58 and its communicating connections reaches the under side of the diaphragm 64 through a passage 62d. When this back pressure, which is the pressure at which the compressed fluid is supplied to the control valve 43, falls during the exhaust of the compressed fluid from the chamber of the cylinder block 25, the diaphragm 64 moves downwardly under the influence of the coil spring 66 with the result that the port 62a is opened by the downward movement of the valve 72, thus admitting additional compressed fluid from the supply pipe 61 to the chamber on the under side of the diaphragm. The diaphragm is then raised, which causes the valve 72 to be moved again to its closed position and this additional supply of compressed fluid is thus passed through the chambers of the pressure regulator to the elbow 58 and the connections leading therefrom to the control valve 43. By suitably adjusting the springs 66 and 74, the frequency and extent of opening of the port 62a by the valve 72 may be regulated in order to maintain any desired pressure of the fluid supply to the fluid control valve 43 as indicated by the gauge 56.

The pressure indicated by the gauge 56 should be regulated in accordance with the character of the material of the work being operated upon by the rotating tap 20 or other tool in order that the tapping of the nut or sleeve, for example, may be satisfactorily completed during the upward movement of the piston 27 and platen 28 with the valve plunger 48 in its depressed condition under the pressure of the foot of the operator. As soon as the tapping of the member 37 or other piece of work is completed, the operator relieves the pressure on the foot pedal 44 with the result that the plunger 48 is immediately restored to its upper normal position, shown in Fig. 7, by the action of the coil spring 50. This opens the exhaust port 45c to communication with the tube 42 through the port 45b so that the compressed fluid in the chamber 25b of the cylinder block is then permitted to escape under the pressure of the piston 27 and platen 28, which then move downwardly by gravity. By adjusting the needle valve 41, the rate of this exhaust of the compressed fluid in the cylinder may be regulated to bring about the desired rate of movement of the threaded member as it is withdrawn from the tap. When the platen 28 reaches its lower position, the tapped member 37 is automatically ejected by the pin 38 and the holder 36 is then in readiness for the insertion of a new untapped member preliminary to another upward movement of the platen 28 which is brought about by again pressing on the foot pedal 44.

In Figs. 8 and 9 of the drawings, there is illustrated a modified form of apparatus for holding the work to be operated upon by the tap or other tool employed in the machine. This modification comprises a cylinder block 85 having a lower flange 85a which is adapted to be secured upon the table 13 of the drill press shown in Fig. 1. The cylinder block 85 is provided with an internal cylindrical chamber slidably engaged by a plunger having mounted upon the upper end thereof a platen 86 which is in the form of a circular block carrying a pair of clamping levers 87 which are pivotally mounted on the platen by means of pins 88. As in the form of construction previously described, compressed air is admitted to the chamber of the block 85 through a fitting 89 and a needle valve 90 is provided for controlling the opening of the port which leads to the chamber. In this way the escape of compressed air from the cylinder may be controlled after the platen 86 has reached the upper limit of its movement which is controlled by a threaded adjusting member 91 secured to a flange 86a of the block and engaged by a pair of nuts 92 which are adapted to engage the under side of the flange 86a to limit the upward movement of the platen. A plate 86b forms the upper part of the platen and is removably attached to the body portion thereof by means of studs 93. The clamping levers 87 are provided with jaws 87a, one of which is V-shaped in form while the other has a flat face, and these jaws are adapted to hold between them the work 94 to be operated upon by the tap 20 or other tool carried by the machine. The clamping levers 87 are adapted to be moved about their pivots to clamp the work 94 by means of an adjusting member 96 which threadedly engages the end of the block 86 and which has a cone-shaped inner end 96a adapted to engage the inclined faces 87b of the levers, as shown in Fig. 8. The adjusting member 96 is provided with an enlarged head 96b at its outer end having apertures 96c therein for engagement by a handle 97 which may be manipulated to engage the adjusting member 96 and move it inwardly and thereby cause the jaws 87a of the clamping levers to close upon the work. The inclined faces 87b of the clamping levers are maintained in engagement with the cone-shaped end 96a of the adjusting member by means of a coil spring 98 which unites aligning apertures 87c formed in the clamping members and which is secured at its ends to pins 99 mounted in these apertures.

Although one form of the invention has been shown and described, together with a modification of the device for holding the work to be operated upon, it will be understood that the invention may have various other forms coming within the scope of the appended claims.

I claim:

1. The combination with the work table of a machine tool, of a cylinder adapted to be removably mounted on said table, a piston in said cylinder, a work support carried by said piston, means for admitting compressed gaseous fluid to said cylinder to effect an upward stroke of said piston, said piston and said work support being adapted to move downwardly by gravity after said upward stroke, and means for regulating the rate of exhaust of said fluid from said cylinder during the downward stroke of said piston.

2. The combination with the work table of a machine tool, of a cylinder adapted to be removably mounted on said table, a piston in said cylinder, a work support carried by said piston, means for admitting compressed gaseous fluid to said cylinder to effect an upward stroke of said piston, said piston and said work support being adapted to move downwardly by gravity after said upward stroke, and means for exhausting said fluid from said cylinder to the atmosphere during the downward stroke of said piston.

3. The combination with the work table of a machine tool, of a cylinder adapted to be mounted on said table, a piston in said cylinder, a work support carried by said piston, a conduit for supplying compressed gaseous fluid to and exhausting it from said cylinder, a valve for controlling the admission of said fluid to said conduit, said valve having a port for exhausting said fluid from said cylinder to the atmosphere when said valve is closed, and manually controlled means for operating said valve.

4. The combination in a machine of the class described, of means for holding a tool, a table located beneath said tool, a cylinder mounted upon said table, a piston mounted in said cylinder, a platen carried by said piston, means carried by said platen for holding the work beneath said tool, means for admitting compressed fluid to said cylinder, and adjustable means for regulating the rate of admission of said fluid.

5. The combination in a machine of the class described, of means for holding a tool, a table located beneath said tool, a cylinder detachably mounted upon said table, a piston mounted in said cylinder, a platen carried by said piston, means carried by said platen for holding the work beneath said tool, means for admitting compressed fluid to said cylinder, and means comprising a foot operated valve for controlling said fluid pressure means while leaving the hands of the operator free for handling the work.

6. The combination in a machine of the class described, of means for holding a tool, a table located beneath said tool, a cylinder mounted upon said table, a piston mounted in said cylinder, a platen carried by said piston, means carried by said platen for holding the work beneath said tool, means for admitting compressed fluid to said cylinder, means comprising a foot operated valve for controlling said fluid pressure means, and a pressure regulator for causing a predetermined pressure to be set up in said cylinder when said valve is opened.

7. The combination in a machine of the class described, of means for holding a tool, a cylinder mounted beneath said tool, a piston mounted in said cylinder, a platen carried by said piston, means for admitting compressed fluid to the lower part of said cylinder, a threaded member carried by said platen, and means adjustably mounted on said threaded member and adapted to engage a part of said cylinder for determining the length of stroke of said piston.

8. The combination in a machine of the class described, of means for holding a tool, a cylinder mounted beneath said tool, a piston mounted in said cylinder, a platen carried by said piston, means for admitting compressed fluid to the lower part of said cylinder, said piston and said platen being adapted to descend by gravity when the pressure is relieved in said cylinder, and means for variably regulating the rate of escape of the compressed fluid from said cylinder.

9. The combination with the work table of a machine tool, of a cylinder adapted to be mounted on said table, a piston in said cylinder, a work support carried by said piston, a conduit for supplying compressed gaseous fluid to and exhausting it from said cylinder, a valve for controlling the admission of said fluid to said conduit, said valve having a port for exhausting said fluid from said cylinder to the atmosphere when said valve is closed, said piston being adapted to move downwardly by gravity during its exhaust stroke, and a needle valve for controlling the rate of exhaust through said conduit.

10. The combination in a machine of the class described, of means for holding a tool, a table mounted beneath and adjustable toward and from said tool, a cylinder mounted upon said table, a piston mounted in said cylinder, a work support carried by said piston, means for admitting compressed gaseous fluid to said cylinder to effect an upward stroke of said piston, the return stroke of said piston being effected by gravity, and means for exhausting the gaseous fluid from said cylinder to the atmosphere during said return stroke.

11. The combination in a machine of the class described, of means for holding a tool, a table mounted beneath and adjustable toward and from said tool, a cylinder mounted upon said table, a piston mounted in said cylinder, a work support carried by said piston, a conduit connected to said cylinder for supplying compressed gaseous fluid thereto and exhausting it therefrom, a valve connected to said conduit for controlling the admission of said gaseous fluid to said conduit, said valve being located in a position to be actuated by the foot of the operator and having means for exhausting said fluid from said conduit to the atmosphere when the connection from the compressed fluid supply is closed, and means mounted adjacent said cylinder for regulating the rate of exhaust through said conduit.

HERMAN GOLDBERG.